Figure 1:
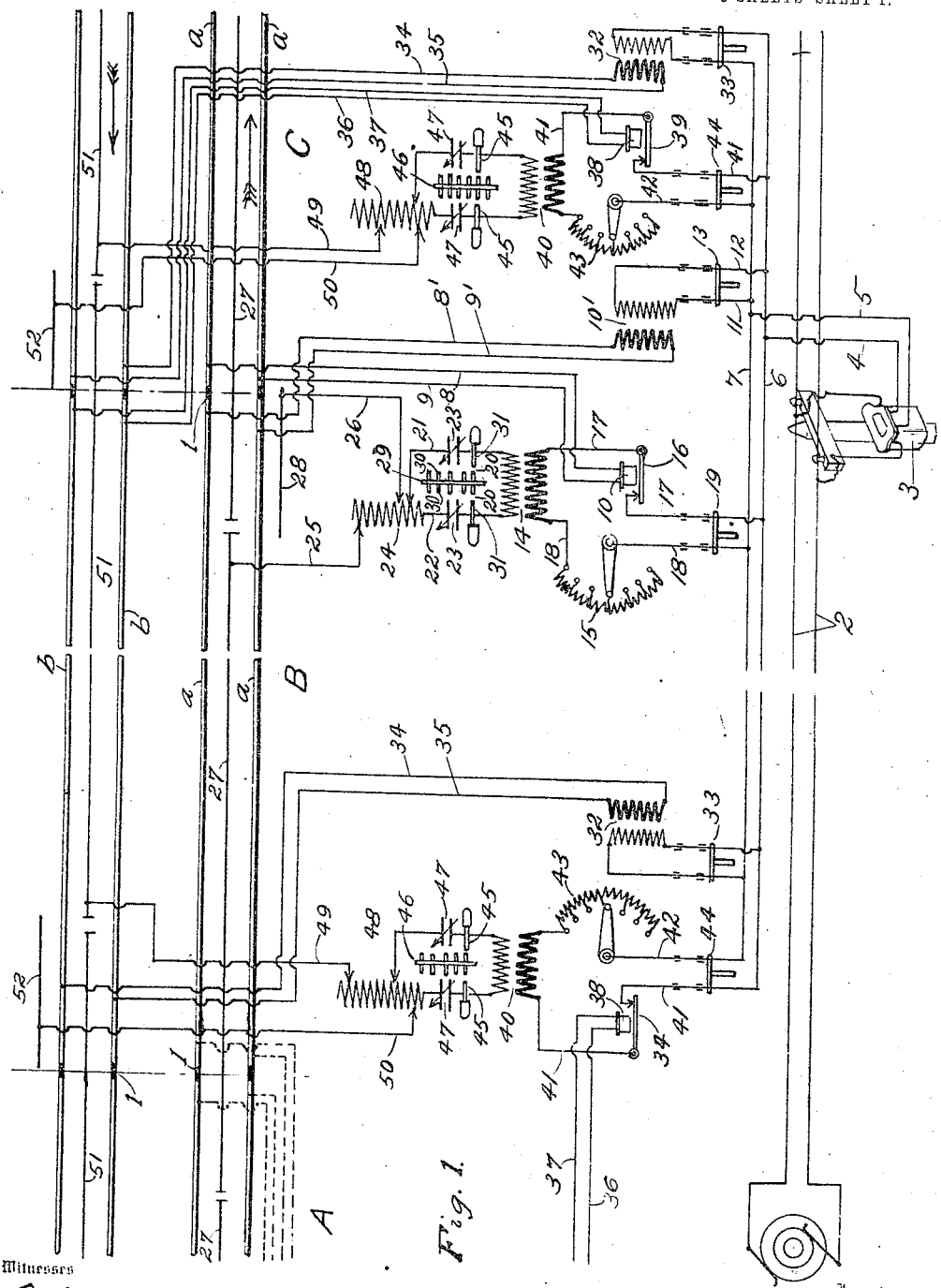

T. E. CLARK.
AUTOMATIC WIRELESS TRAIN CONTROL APPARATUS.
APPLICATION FILED FEB. 26, 1912.

1,104,165.

Patented July 21, 1914.

9 SHEETS—SHEET 1.

Witnesses
O. B. Baenziger.
J. Otto Baenziger.

Inventor
Thomas E. Clark
By E. S. Wheeler
Attorney.

T. E. CLARK.
AUTOMATIC WIRELESS TRAIN CONTROL APPARATUS.
APPLICATION FILED FEB. 26, 1912.

1,104,165.

Patented July 21, 1914.

9 SHEETS—SHEET 4.

Witnesses
J. Otto Baenziger
O. B. Baenziger

Inventor
Thomas E. Clark
By E. S. Wheeler
Attorneys

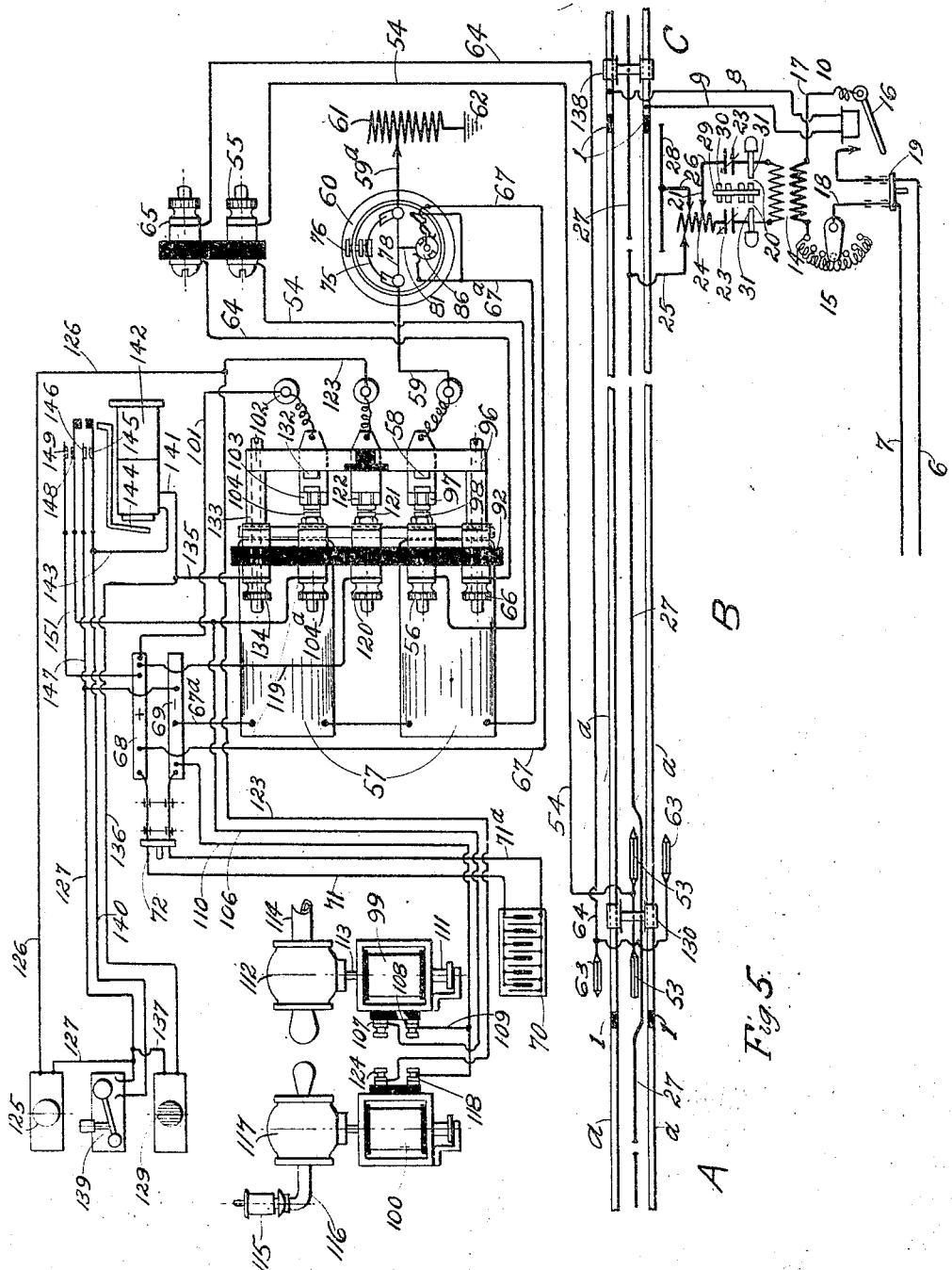

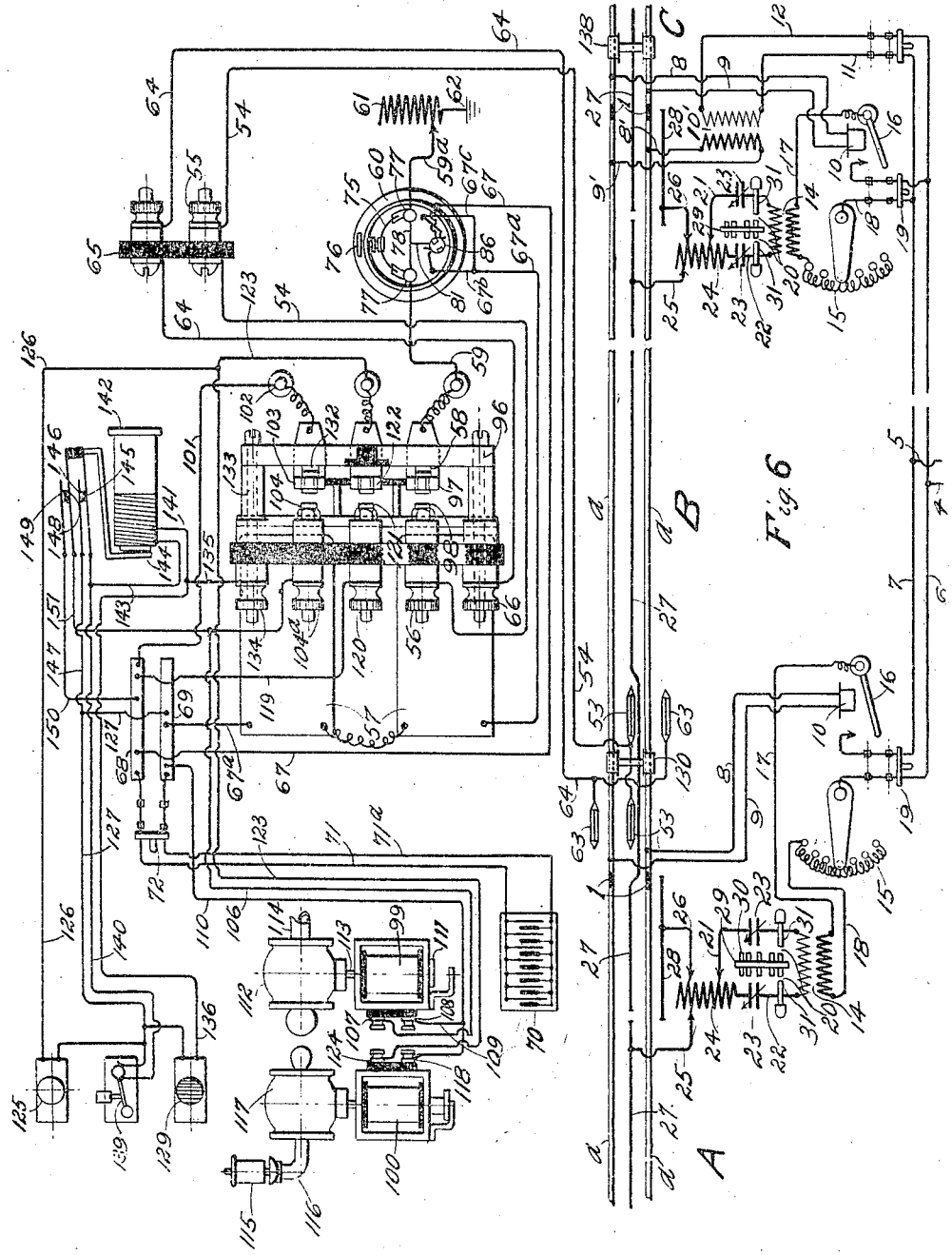

T. E. CLARK.
AUTOMATIC WIRELESS TRAIN CONTROL APPARATUS.
APPLICATION FILED FEB. 26, 1912.
1,104,165.
Patented July 21, 1914.
9 SHEETS—SHEET 7.
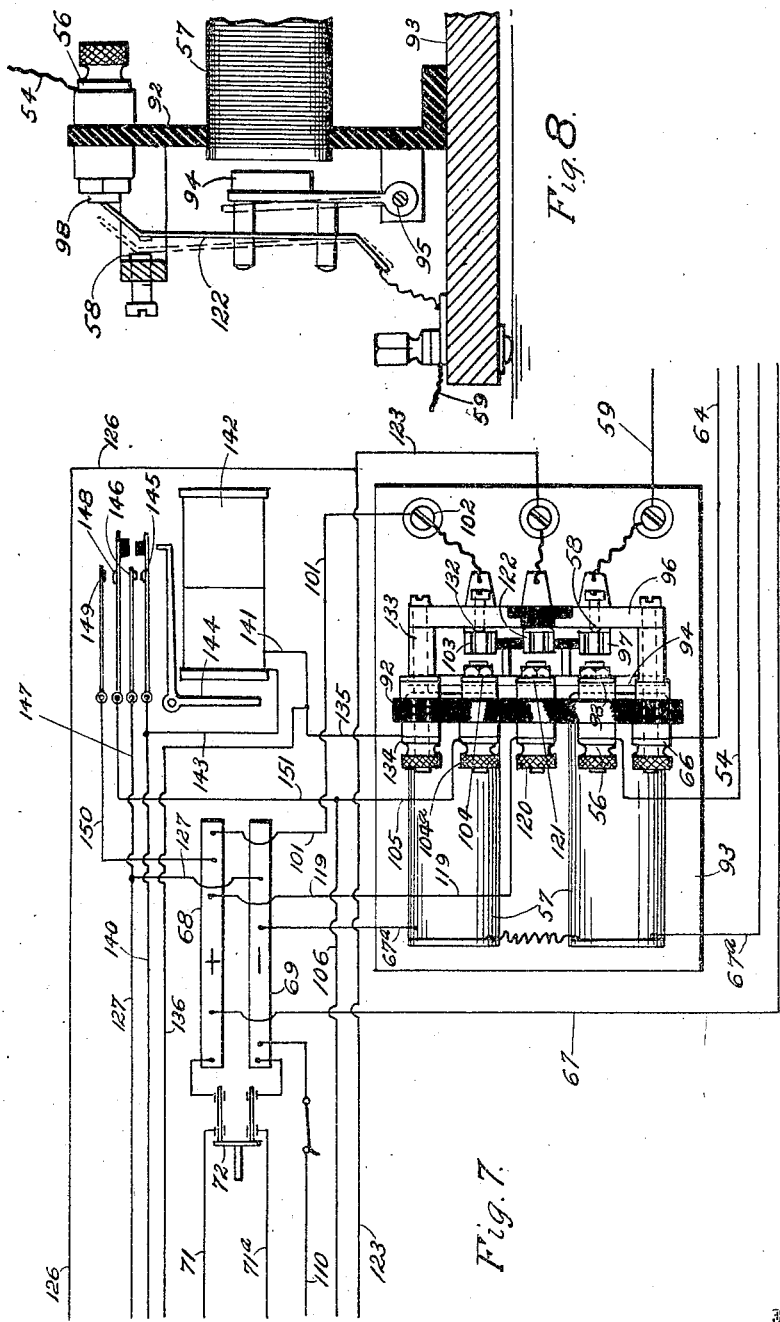

T. E. CLARK.
AUTOMATIC WIRELESS TRAIN CONTROL APPARATUS.
APPLICATION FILED FEB. 26, 1912.
1,104,165.
Patented July 21, 1914.
9 SHEETS—SHEET 8.
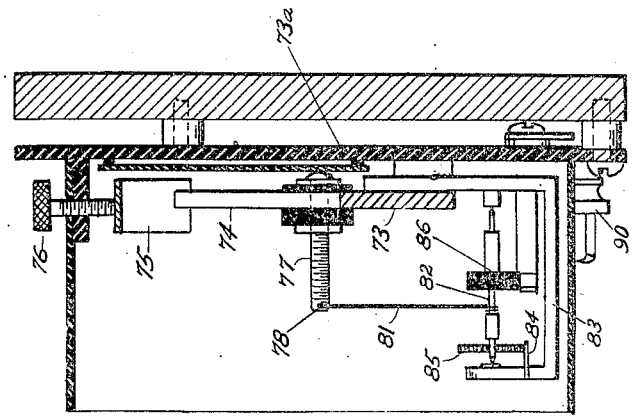
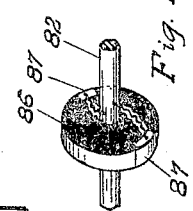
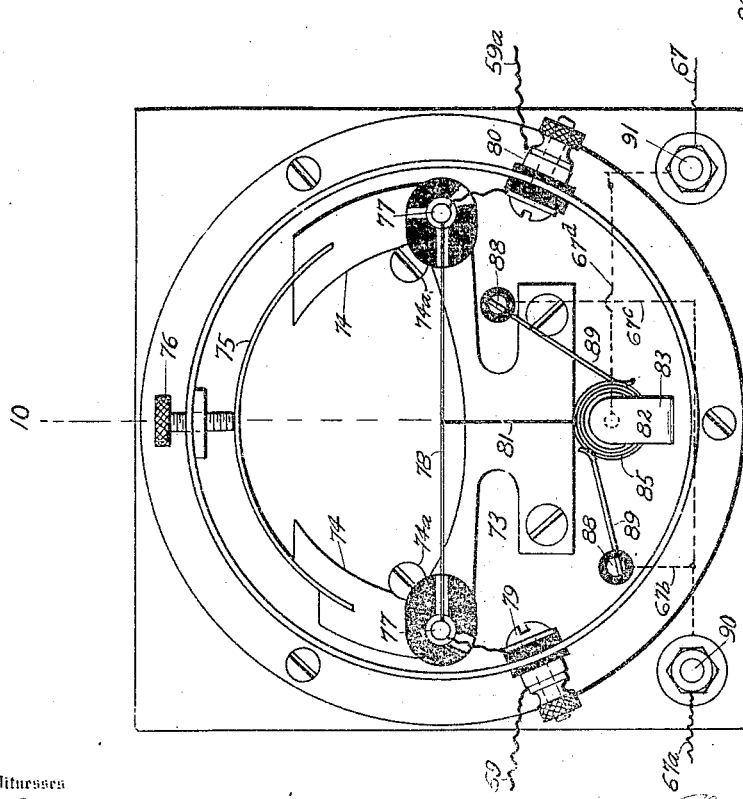

T. E. CLARK.
AUTOMATIC WIRELESS TRAIN CONTROL APPARATUS.
APPLICATION FILED FEB. 26, 1912.
1,104,165.
Patented July 21, 1914.
9 SHEETS—SHEET 9.
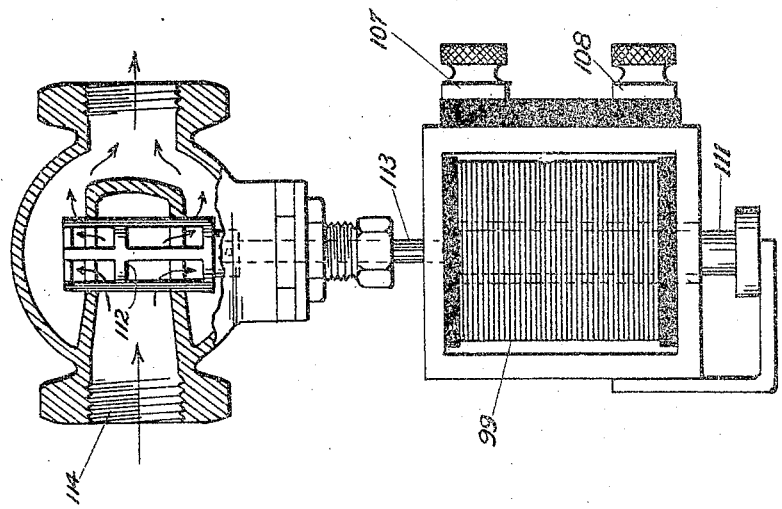
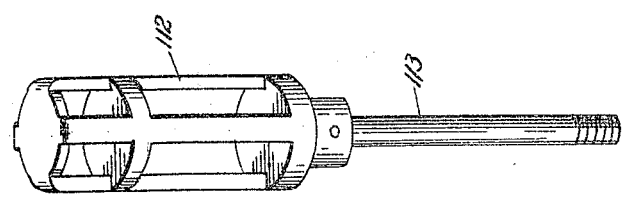
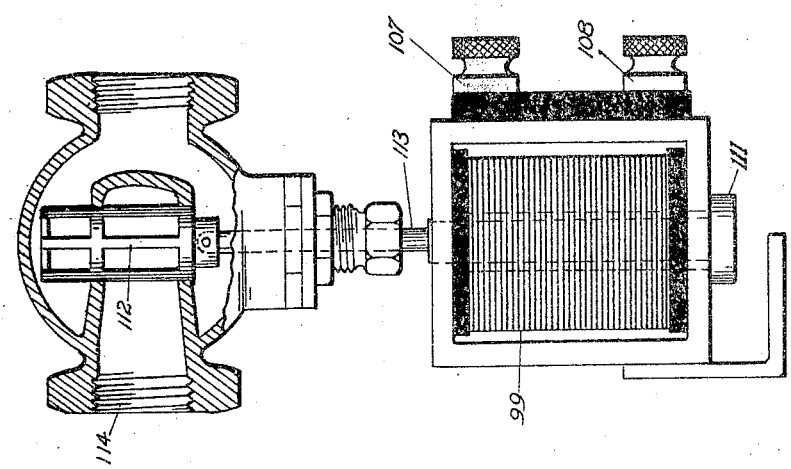
Witnesses
O. B. Baenziger.
J. Otto Baenziger.
Inventor
Thomas E. Clark
By E. S. Wheeler
Attorney.

UNITED STATES PATENT OFFICE.

THOMAS E. CLARK, OF DETROIT, MICHIGAN.

AUTOMATIC WIRELESS TRAIN-CONTROL APPARATUS.

1,104,165.        Specification of Letters Patent.        Patented July 21, 1914.

Application filed February 26, 1912. Serial No. 679,803.

*To all whom it may concern:*

Be it known that I, THOMAS E. CLARK, a citizen of the United States, residing at Detroit, in the county of Wayne, State of Michigan, have invented certain new and useful Improvements in Automatic Wireless Train-Control Apparatus; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to automatic wireless train-control apparatus especially designed for use in connection with block signal systems for the control of railway trains, and consists in the construction, association and coöperation of parts hereinafter more fully set forth and pointed out particularly in the claims.

The primary object of the invention is to provide simple and efficient apparatus for use in connection with high-frequency high-potential alternating currents, or sustained electrical oscillations whereby said currents may be utilized for controlling electrically actuated signal devices upon cars, locomotives, cabs, controlling stations, and switches, to indicate conditions as to safety or danger within a certain block or zone, and warn the engine man when conditions of danger arise, at the same time making automatic application of the brakes to stop the train.

A further object is to provide a generator of high frequency currents for the control of said signaling apparatus for each block of the track, and to provide means whereby said generator is controlled by conditions of safety, to supply high-frequency current or sustained oscillations, and by conditions of danger to suspend the production of said energy.

A further object of the invention is to provide a second circuit to be carried upon the locomotive, or other convenient part of the train, or on a single vehicle, upon which circuit high frequency current energy is impressed from the high-frequency high-potential oscillating current circuit, said impressed current circuit comprising a responder or a circuit closer actuatable by the flow of current induced therein to close a local circuit and cause a resultant action of the signal apparatus.

A further object is to provide means whereby the engine man can release the brakes of his train and proceed cautiously under control until the danger is located, or until he receives a signal that the track is clear and that he may proceed without further caution.

The invention further contemplates such arrangement, construction, and operation of parts as will make applicable for operative purposes a system of this kind with respect to conditions encountered in the actual operation of railway trains over either single or double tracks in both directions.

The above objects are attained by the construction and operative association of parts illustrated in the accompanying drawings, in which:—

Figure 2:
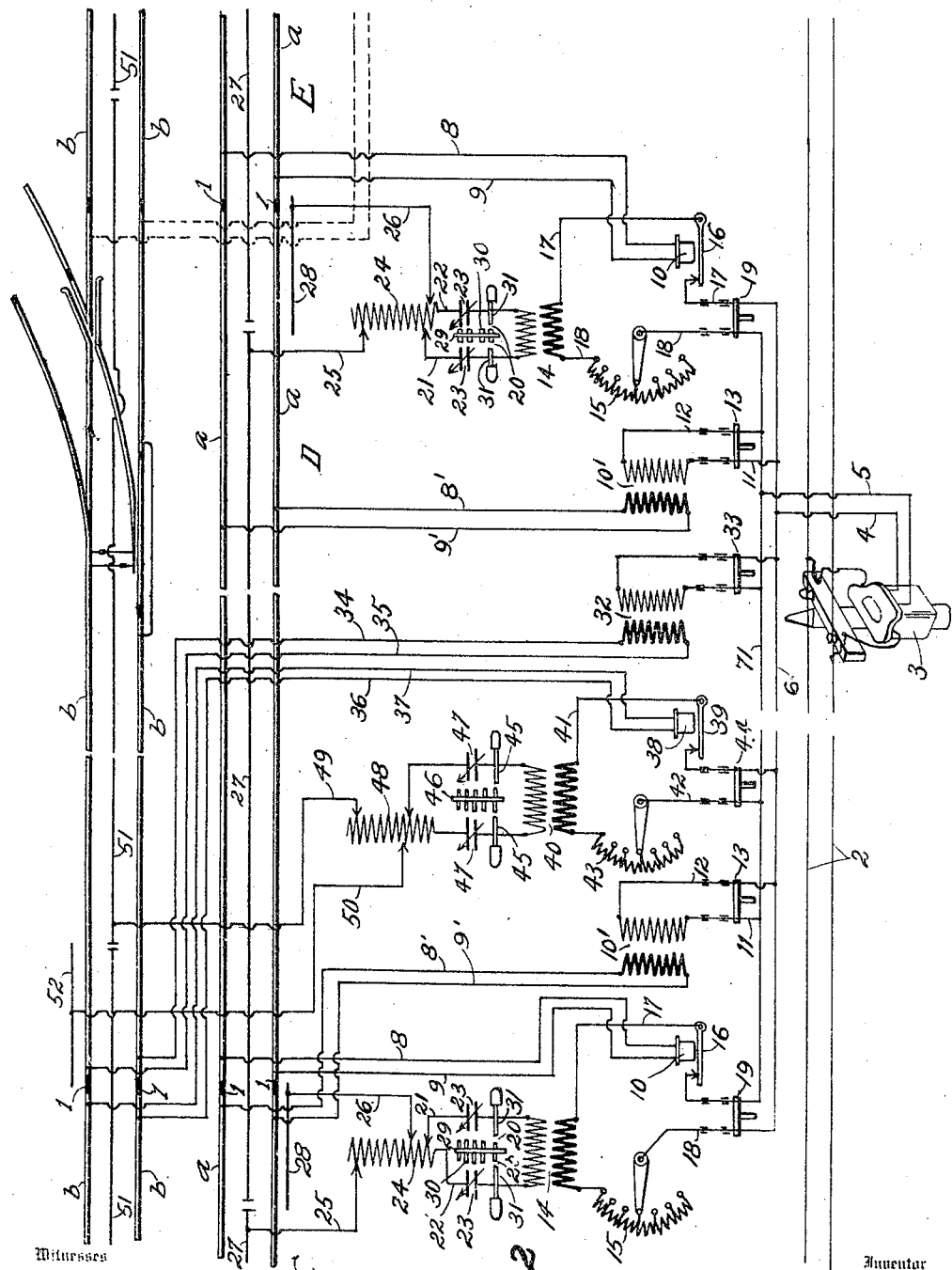
Figure 3:
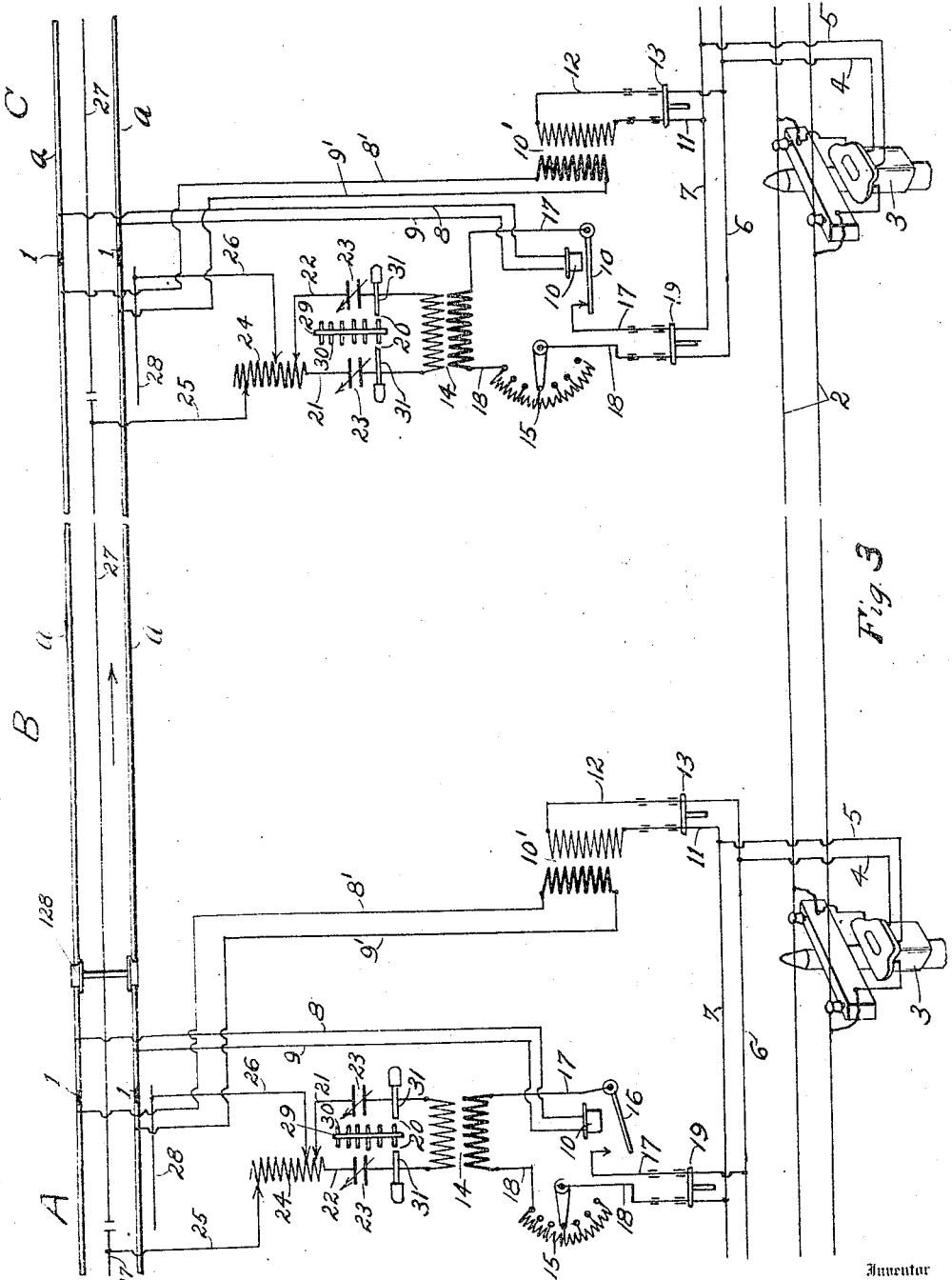
Figure 4:
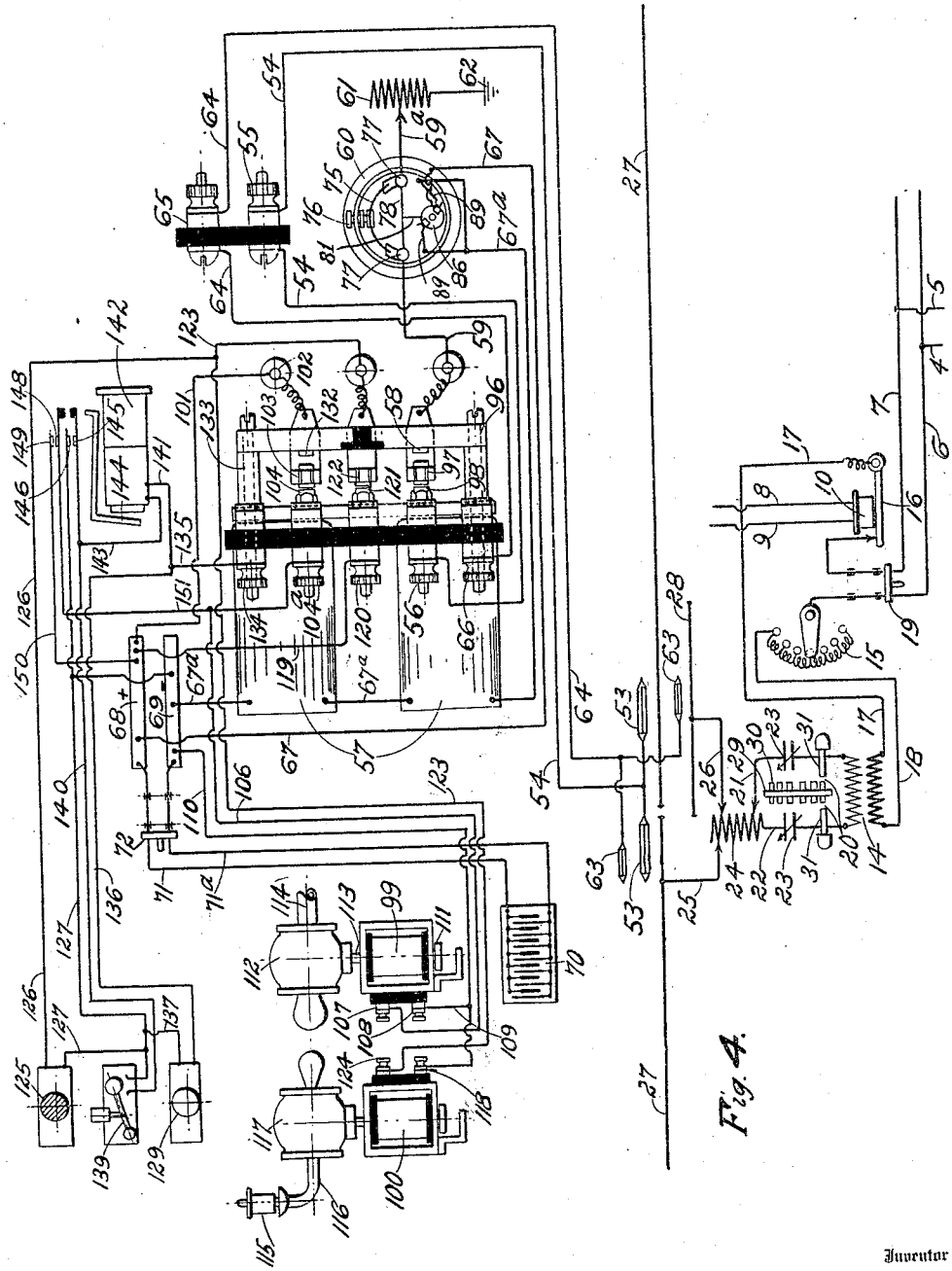

Figures 1 and 2 illustrate diagrammatically the application of this invention to a double track railway, showing generating circuits and track circuits and the apparatus for controlling said circuits as applied to and used in connection with three blocks of said double track. Fig. 3 is a diagrammatical view showing how by short circuiting the track circuit in one block, the generating circuit in the succeeding block will be opened to stop the flow of high-frequency high-potential alternating current in the circuit therein. Fig. 4 is a diagrammatical view of the apparatus carried on the locomotive for controlling the brakes and signals and a high-frequency high-potential oscillating current circuit in operative association therewith, the position of the parts being such as obtains when the train is running under conditions of safety. Fig 5 is a diagrammatical view of the apparatus illustrated in Fig. 4, showing in addition, two blocks of a track and the apparatus on the engine as having been actuated because of a condition of danger to apply the brakes and actuate the alarm or danger signal. Fig. 6 is a diagrammatical view of the apparatus similar to Figs. 4 and 5, illustrating two blocks of a track, and the track and generating circuits, and showing a position of parts when the engine man has released the brakes and is proceeding under caution or control after the train has been stopped through the automatic actuation of the apparatus, because of the presence of a train in the block ahead. Fig. 7 is a view on a larger scale, of the main relay carried on the locomotive or tender, and located in the receiving circuit upon which current is impressed, by the oscillations from the high-frequency high-potential alternating current circuit, showing in connection with said relay the circuit wires of the signal circuits, and of the brake releasing or controlling key. Fig. 8 is an enlarged vertical section through said relay. Fig. 9 is a plan view of the responder or thermo-electric circuit closer located in the receiving circuit carried on the locomotive or tender, and actuable by the passage of the impressed current from the high-frequency high-potential alternating current circuit to close the local circuit and bring into action the signal controlling mechanism. Fig. 10 is a sectional view therethrough as on line 10—10 of Fig. 9. Fig. 11 is a detailed section of the rotary disk in the form of a commutator through which said local circuit is closed and opened. Fig. 12 is a perspective view of said disk. Fig. 13 is a fragmentary view, partly in elevation, illustrating one of the signal controlling valves closed, as its solenoid is energized. Fig. 14 is a similar view, showing said valve open as when its solenoid is de-energized. Fig. 15 is a perspective view of the balanced valve cage as employed in said valve.

By maintaining a source of energy such as an alternating current generator, and associating therewith a circuit containing the requisite elements therein, there may be produced in said circuit high-frequency high-potential oscillating currents. Said circuit may be termed the primary oscillating circuit in which high-potential high-frequency discharges are caused to occur. If the high-frequency circuit be made adjustable as to capacity and inductance, and if a conductor of a certain capacity and a certain inductance be connected therewith, it will be found that the high-frequency oscillating currents of the primary oscillating circuit will flow in said conductor. If a second circuit, termed a receiving circuit of variable inductance or capacity be placed parallel and in proximity to a high-potential high-frequency circuit, there will be impressed upon the receiving circuit a high-potential high-frequency oscillating current, when said circuits are properly tuned. If the receiving circuit is sufficiently near to said high frequency current conductor this action will be different from the usual Hertzian wave action and the current in the receiving circuit will be of sufficient strength to cause a lamp placed in the receiving circuit to glow brilliantly, or to effect the actuation of instrumentalities, either directly or indirectly, for operating signal and train control devices, or for other purposes, although there is no electrical connection between said circuits. The question of tuning, however, is of material importance, for if the receiving circuit be not properly tuned, a feeble flow of current only will be noted therein.

In utilizing the above principle in a railway train control system I have illustrated one mode of its application in connection with the tracks of a double-track railway, and will proceed to describe the electrical and mechanical devices employed in an operative system of train control, as shown in the accompanying drawings, wherein said parts will be described in connection with the reference characters marked thereon.

Referring to Figs 1 and 2 $a$ designates the rails of a railway track for traffic bound in one direction, which I will hereafter term east bound traffic, and $b$ designates the rails of a railway track for the traffic bound in the opposite direction, which I will hereafter term west bound traffic, of a double track railway system. These tracks, as will be seen, are divided by sections of insulating material 1 into blocks A, B, C, D, and E. Common to all of the blocks are the power mains 2 carrying an alternating current of high voltage which at each block passes through a transformer 3, and thence on the lines 4 and 5 to the lines 6 and 7 of the block system, which, in practice, will carry preferably an alternating current of approximately 110 volts. The track will be divided into sections of predetermined lengths, called blocks, and the block equipment for each block will be the same, and consists, first, in a track circuit including the rails of the block, the lines 8 and 9 connected thereto at one end, and including the track relay or electro-magnet 10, the lines 8' and 9' connected with the opposite end of the track rails of the block, and the track circuit transformer 10', the lines 11 and 12 connecting said track transformer through the switch 13 with the source of current energy, which is the lines 6 and 7; and second, apparatus for producing high-frequency high-potential oscillating currents for that block, comprising a transformer 14, the primary circuit of which includes a reactance regulator 15 and the armature 16 of an electro-magnet included in the lines 17 and 18 of said circuit, which are connected through a switch 19 with the source of energy or power circuit 6 and 7. Connected across the terminals of the high-potential secondary of the transformer 14 is a spark gap 20. A high-potential oscillating circuit is formed to include said spark gap by means of the lines 21 and 22, in each of which is located a condenser 23. To complete said oscillating circuit across the spark gap there is introduced therein, one or more turns of a copper inductance or linking coil 24, thus forming a closed oscillating circuit in which high-potential high-frequency oscillating discharges take place, the connection of the line 21 of said circuit with the inductance coil or helix 24 being made adjustable in the usual manner. Adjustably connected with the inductance or linking coil 24 are lines 25 and 26 respectively, line 25 terminating in a conductor 27, which is located close to the ground and lies parallel with the track preferably between the rails thereof, and which is equal in length to the length of a block of the track, being so disposed however as to terminate some distance from the insulated joint between the rails at one end, and to extend beyond said insulated joint into the next block to the rear at the other end. At the termination of the line 26 is a counterpoise 28 or balancing capacity, which lies parallel with the track close to the ground and, preferably at one side, and extends from the insulated joint of the track along the block to the joint opposite the terminal of the conductor member 27 of that block. These lines 25 and 26 with their terminal portions 27 and 28 respectively and the linking coil 24, form a conductor, which for convenience will hereafter be termed the wayside circuit into which, at each discharge in the high-frequency oscillating circuit, high-potential current energy is received to oscillate forth and back therein. The counterpoise 28 acts as a balancing capacity in the wayside circuit to extend from the linking coil in opposed relation to the limb or element 27 of said circuit. A potential difference is set up which causes a strong surging of the oscillations throughout said circuit between said elements 27 and 28, by reason of which the high-frequency current may be forced to the extremities of the wayside circuit, when the limbs of said circuit are brought into resonance by varying the inductance and capacity thereof through the adjustable connections of said limbs with the linking coil. By this means the energy is rendered as powerful at the extremity of the long limb 27 as at its point of connection with the oscillating circuit, effecting an equal distribution of power along said limb and making possible the actuation of instrumentalities from energy therefrom at any point throughout its length. The spark gap is effected through the medium of a revolving disk 29 having laterally projecting conducting studs 30, which, as said disk revolves, pass between the spark gap electrodes 31. Said electrodes are adjusted to afford an air gap between them, normally too great for the oscillating current to spark across, but when the projecting studs on the rotary disk pass between said electrodes, the air gap is shortened and high-frequency high-potential oscillating current discharges take place in the oscillating circuit.

The function of a spark gap in an oscillatory circuit is to allow the condenser to charge to the required potential and then to break down and permit the charge to surge back and forth until the energy is dissipated. To obtain the best results from the spark gap, it is desired that it shall afford a proper insulation when the condensers are charging, and shall conduct perfectly while the condensers are discharging. The nearer these conditions can be arrived at the more efficiently will the spark gap perform its duty. It is well known that the heated surfaces of the electrodes at the spark gap give off metallic vapor which tends to form a low-frequency arc and causes considerable irregularity in the radiating current. After the condenser is charged the insulation of the spark gap breaks down and the gap momentarily becomes filled with metallic vapor, which, for the time being, forms a high-frequency alternating current arc. It is the presence of the metallic vapor which affords conductivity for the spark. After the discharge ceases, however, if said metallic vapor be not removed from the spark gap, the insulation will be poor at the time the condenser is next being charged, hence the condition of spark efficiency will be wanting. It is, therefore, necessary to remove this vapor immediately and completely after the surgings of the condenser charge cease. This is done by means of the rotating disk whose projecting studs pass between the stationary electrodes, and arrangement which tends to obviate the metallic vapor arc and causes a flow of air between the electrodes thereby keeping them cool. By rotating the disk in timed relation with the frequency of the current supply to the primary of the transformer, its speed may be so regulated that one of its studs shall come opposite the stationary electrodes at the exact moment that the maximum of potential is obtained in the condenser. This will insure one discharge for each alternation of the current, while the complete absence of conducting vapors insures a satisfactory insulation for each high frequency oscillating discharge at the spark gap. The regularity of discharge because of this form of spark gap produces a current of uniform quality in the wayside circuit, and conduces to a perfect transfer of energy between the oscillating and wayside circuits.

In practising this invention the high-frequency generating circuit will be closed for hours, hence the regularity of discharge at the spark gap to produce a uniform quality of current in the wayside circuit is very important, and requires an arrangement which differs materially from other oscillating circuits where the closing of a key momentarily produces, for short intervals, an oscillating spark at the spark gap.

It will be noted that the track relay 10 of the block in advance controls the armature 16 that forms a portion of the circuit which supplies energy to the oscillating circuit of the block in the rear, said relay acting as a circuit closer and opener accordingly as it is energized and deënergized. It will be further noted that the short circuiting of the track circuit of the block in advance would deënergize the relay 10 of said circuit, thereby permitting the opening of the circuit conveying electrical energy to the high-frequency circuit, thus resulting in a cessation of energy from the wayside circuit. The track transformers 10′ are employed to step down the current from the power circuit, each track transformer supplying current to a track circuit including a relay 10, the arrangement being such that the track transformer in each block energizes a track circuit relay, said relay controlling the supply of power or energy to the transformer of the high-potential oscillating circuit which furnishes energy for the adjacent block in the rear.

I have up to the present time confined my description to the apparatus associated with and adapted to supply energy to the east bound track. The apparatus for the west bound track is the same. The apparatus for the west bound track may be described briefly as a track transformer 32 connected through a switch 33 with the power lines 6 and 7, and through the lines 34 and 35 with the track rails $b$, said rails being in turn connected through the lines 36 and 37 with the track relay 38 of the same block, which, when energized, attracts an armature 39 and holds closed the primary circuit of the transformer 40, comprising the lines 41 and 42, and including the reactance regulator 43, the lines of said circuit being connected through the switch 44 with the power lines 6 and 7. The terminals of the secondary transformer 40 are connected to the spark gap electrodes 45, between which revolves the disk 46 carrying the conducting studs which coöperate with said electrodes to shorten the gap between the electrodes as the disk revolves. The oscillating circuit includes the condensers 47 and one or more turns of the linking coil or helix 48 with which one terminal of the oscillating circuit is adjustably connected. Also adjustably connected with said linking coil is the wayside circuit comprising the lines 49 and 50, terminating in the wayside circuit conductor 51 and a counterpoise or balancing conductor 52. The function and operation of this apparatus is the same as that already described, and is employed to supply energy to the west bound track and to control such supply.

To utilize the energy from the wayside circuit between and alongside the track-rails, and designated as elements 25, 26, 27 and 28, there are employed a receiving circuit and a local operating circuit controlled by said receiving circuit, both mounted on the train, preferably on the locomotive and tender. The local circuit may be energized in any desired manner, storage batteries prefered, and the current of said circuit operates the various instrumentalities hereinafter described. The receiving circuit comprises a main branch and a pick-up branch, the former utilizing the energy from the main-line circuit member 27, and the other utilizing energy from the part 28. Said receiving circuit is shown diagramatically in Fig. 4 associated with the wayside circuit and with the generator of high-potential high-frequency oscillations, and with the oscillating circuit, and said receiving circuit comprises harp members 53 of certain capacity, formed of a plurality of strands of wire connected to one terminal of the line 54 and located under the locomotive so as to parallel the wayside circuit member 27 at a predetermined distance therefrom. The line 54 leads to a binding post 55, thence to a front binding post 56 of the main relay 57, the movable contact 97 of the armature of the relay, when in the position shown in Fig. 4, thence on the line 59 to thermo-electric relay 60, thence to the variable inductance 61, and then to ground 62. The pick-up branch circuit is also mounted on the locomotive, and comprises smaller harp-like elements 63 adjacent and adapted to receive electrical energy from the counterpoise or balancing capacity 28, and disposed in spaced parallel relation thereto. The receiving elements 63 of the pick-up circuit are connected to line 64 leading to binding post 65, and thence to the front binding post 66 on the main relay, thence by the metallic frame 96 of said relay to the rear contact 58, the movable contact 97, and on line 59 through thermo-electric relay 60, thence to inductance 61, and to earth 62. Said pick-up branch circuit is closed when the main relay 57 is deënergized, and being thus closed is the first to receive current influence from the wayside circuit, which current influence flowing along the line of the pick-up branch circuit energizes the thermo-electric relay to close a local circuit including the main relay 57 and energizes said main relay 57 to put into operative position the train control and signal apparatus as hereinafter explained.

The local circuit which also includes the thermo-electric relay and main relay or electro-magnet 57, comprises the lines 67 and 67ª, which lead to the bus-bars, of which 68 is the positive and 69 the negative. These bus-bars are employed as a matter of convenience for making electrical connection with the several electrical devices and are in turn connected with the storage battery 70 by means of the lines 71 and 71ª through a suitable switch 72. The thermo-electric relay 60 which is connected in the pick-up and receiving circuits will now be described with respect to its construction and operation, reference being had more particularly to Figs. 9 to 12 inclusive. Rigidly secured to a suitable base 73ª is a brass bracket 73 having laterally extending terminal portions 74, connected by a spring 75, curved in the arc of a circle. Engaging said spring is an adjusting screw 76 to vary the tension thereof for purposes hereinafter stated. Mounted at the angles of the lateral projections of the bracket 73 are the insulated posts 77. Extending between and electrically connecting the posts 77 is a fine wire filament 78 of high resistance, and preferably of non-oxidizable metal. The receiving circuit wire 59 leads to a binding post 79, thence to one of the posts 77, while the opposite post is connected electrically with a binding post 80 from which leads the receiving circuit wire 59ª to the inductance 61, thus completing the path of the receiving circuit across the fine wire filament of the thermo-electric relay. Extending downwardly from the central portion of the fine wire 78 is a strand of fine silk fiber 81 whose lower end is wound around a spindle 82, journaled at its ends as shown in Fig. 10 in the supporting bracket 83. Fastened at one end to the spindle, and secured at its other end to a small stud 84 is a fine coiled spring 85. The tension of this spring is normally exerted to place a light stress upon the silk fiber 81 and to exert a slight downward pull upon the fine wire 78. Upon the spindle 82 is a disk 86 of insulating material having two opposed contact plates 87 in the periphery thereof, which are electrically connected to said spindle, as shown in Fig. 12. Mounted upon the insulated pillars 88, are the contact arms 89 of thin platinum or other metal of high conductivity. The outer ends of these contact arms rest against the periphery of the disk 86 of insulating material on the spindle 82. The line 67ª of the local circuit leads to a binding post 90, and thence on the lines 67ᵇ and 67ᶜ to the pillars 88 of the lines 67ᵇ and 67ᶜ to the pillars 88 of the contact arms 89. The other line 67 of the local circuit leads to a binding post 91 and from thence on line 67ᵈ to the spindle or shaft 82.

When the parts are in their normal position, the contact arms 89 rest against the insulation surface of the disk 86, so that the local circuit, comprising the lines 67 and 67ª, is normally open, in which position the tendency of the spring 85 to turn the shaft or spindle 82 is resisted by the silk strand 81, which holds the disk 86 against rotation. Upon the passage, however, of a high-frequency current over the pick-up of the receiving circuit, comprising the line 64, the binding post 66 on the main relay, the back contact 58, the movable contact 97, and the line 59 leading to the thermo-electric relay, the flow of current over the fine wire filament 78 will instantly heat it to such an extent as to cause it to sag and allow the spring 85 to slightly rotate the shaft 82 and turn the disk such a distance as to cause the contacts 87 thereon to register with the contact arms 89, thereby closing the local circuit 67 and 67ª and energizing the main relay 57, said local circuit remaining closed as long as there is a flow of current in the receiving circuit over the fine wire 78 of the thermo-electric relay of sufficient energy to heat said wire and cause a sag therein.

Upon the cessation of current across the fine wire filament it will cool and contract, thereby drawing up the silk strand 81 and rotating the spindle 82 against the action of the spring 85, which carries the contacts 87 out of electrical connection with the contact arms 89, and opens said local circuit. It will be noted that the contact arms 89 are in shunt with one another, the arrangement being such that the local circuit through the main relay will be closed by contact of either one of said arms with one of the contact plates on the insulating disk 86. It will further be noted that by manipulating the screw 76 so as to exert a pressure upon the spring 75 the curved terminals 74 of the bracket may be spread or forced apart so as to place the desired tension upon the fine wire filament 78, said screw being employed to regulate or vary the said tension to properly adjust the device for various working conditions. Flat headed screws 74ª hold the bracket arms 74 from swinging forward.

The main relay 57 has several important functions in connection with the signal and train control apparatus, and that it may be understood in detail with respect to its construction and operation, it will now be more fully described, reference being had more particularly to Figs. 7 and 8. A frame 92 is mounted upon a suitable base 93, said frame carrying the binding posts for the several lines and also supporting the energizing coils. The armature 94 is pivoted at 95 and carries thereon a plurality of movable contact members 97 and 103 adapted, when the relay is energized, to make contact with the front contacts or binding posts, and when the relay is deënergized to drop back by gravity and make contact with the plurality of rear binding posts as indicated by the full and dotted lines in Fig. 8, and a third movable contact member 122 adapted, when the relay is energized to engage the front contact 121. As already stated, when the relay is deënergized, the pick-up branch 64 of the receiving circuit is closed through the post 66 of the main relay to which said line leads, through the metal portion 96 of the frame of the relay with which said binding post is in electrical contact, through the back contact 58, the spring contact member 97 on the armature, and through the line 59 leading from said contact member to and through the thermo-electric relay and the inductance 61 to the ground. The effect therefore of the initial passage of a current over the pick-up branch of the receiving circuit will be to actuate the thermo-electric relay and close the local circuit 67 and 67ª, thereby causing the energizing of the main relay, causing it to attract its armature and carry the movable contact members thereon into engagement with the front contacts of the relay. This energizing of the main relay produces several results by reason of the closing of the several circuits through the front contacts thereof, the first being that of closing the main receiving circuit through the contacts of said relay as follows: Upon the energization of the main relay and the consequent attraction of its armature, the receiving circuit, including the line 54, will be closed, and will comprise the binding post 56, the front contact 98 of the relay which will then be engaged by the movable contact 97, (which will at that time be swung out of engagement with the rear contact 58,) and through the line 59 connected with said movable contact to the thermo-electric relay 60, the variable inductance 61, and ground 62. This closing of the main receiving circuit by the energization of the main relay will cause the high-potential current which is being impressed into the harps 53 of said circuit to flow constantly across the fine wire filament 78 of the thermo-electric relay, notwithstanding the fact that the actuation of the armature of the main relay will have opened the pick-up circuit by separating the movable contact 97 from the back contact 58. This current over the filament 78 of the thermo-electric relay will maintain closed the local circuit in which the main relay is located so long as there is a flow of current in the receiving circuit, a condition illustrated in Fig. 4, which is the normal condition when a train is running under conditions of safety.

Upon the actuation of the main relay through the closing of the local circuit, circuits are closed through the solenoids 99 and 100 respectively, the circuit of solenoid 99 being traced as follows: The path of the current is from the positive bus-bar 68 (Fig. 7) on line 101 to binding post 102, thence to movable relay contact 103, from relay contact 104, line 105, leading from binding post 104ª of said front contact and joined line 106 to terminal 107 of the solenoid coil 99, (Fig. 4), thence from terminal 108 of said coil on line 109 to line 110, and on said line to negative bus-bar 69. This closing of the circuit of the solenoid 99 will energize it and actuate its core 111 to close the valve 112, the stem 113 of which is connected to the said core, said valve controlling the train pipes 114 of the air brake system. The construction of the valve and its manner of operation through the energization and deënergization of the solenoid 99 will be more clearly understood upon reference to Figs. 13 to 15, inclusive. In Fig. 13 the solenoid 99 is shown energized and the valve 112, which is of the balanced type, is shown closed. In Fig. 14 this magnet is shown deënergized and the valve open to permit of the passage of fluid under pressure. Other types of valves may be employed, the one herein shown being deemed sufficient to illustrate the principle of operation. It is well known that in air brake systems, an application of the brakes is made by exhausting air from the train pipe. When the valve 112 is opened, train pipe pressure is allowed to escape and an application of the brake occurs. Upon the energization of the magnet the valve is closed, so that the train pipe pressure may be restored, and the brakes released in the usual manner.

It is designed to employ in connection with this system an audible alarm in the form of a whistle, illustrated at 115 in Figs. 4, 5, and 6, connected with an air or steam pipe 116, which is controlled by a valve 117 similar in construction and operation to the valve 112 just described. Like valve 112 the stem of valve 117 is connected with solenoid 100 and is actuated by the energization and deënergization of said solenoid as is valve 112. While the solenoid remains energized the whistle valve 117 is closed and air or steam is cut off from the whistle. Upon the deënergization of the magnet 100 the whistle valve will open and air or steam under pressure from any suitable source is allowed to pass into the whistle and sound an alarm. The circuit of solenoid 100 includes the line 110 which leads from the coil terminal 118 thereof to the negative bus-bar 69; the line 119 which leads from the positive bus-bar 68 to the binding post 120 of the front contact 121 of the main relay, thence, when said relay is energized, through the movable contact 122 and therefrom on line 123 to the other terminal 124 of the winding of the solenoid 100. It will therefore be apparent that the energizing of the main relay closes the circuit of solenoid 100 simultaneously with the closing of the circuit to the solenoid 99, said solenoids being thereby energized to actuate their respective valves to close the train pipe, and the air pipe leading to the whistle. There is a still further function performed by the energization of the main relay, and that is the closing of a circuit through the colored lamp 125, preferably green, which is located in the locomotive cab to serve as a visual signal, and whose circuit comprises the line 119 leading from the positive bus-bar, the contacts 121 and 122, the line 123, the connected line 126 which leads to said lamp, and the return line 127 which connects to the negative bus-bar 69, thus causing a flow of current from the battery 70 through said lamp while the main relay remains energized.

It will now be understood that while the receiving circuit is receiving the energy impressed upon it by the wayside circuit, the main relay will remain energized and keep closed the circuits for the currents that will energize the solenoids to maintain the whistle and train valves closed, and at the same time keep closed the circuit of the signal lamp 125, which will preferably be green in accordance with the custom employed in railway signals to indicate a clear track and conditions of safety. This visual signal is not necessary in connection with the audible whistle, but its use is preferred as an additional safeguard. The engine man in the cab, as long as this condition obtains, will know that the track is clear, and that he may drive his train in accordance with its schedule.

The supply of high-potential energy to the wayside circuit, as already explained, is controlled by the track relay 10, and Fig. 3 illustrates how the presence of a train in a block will short circuit the track circuit of that block and cut off the supply of energy to the block to the rear, that is, the block over which the train has just passed. Referring to Fig. 3 by the reference characters thereon, 128 indicates a train in block B, the current for the track circuit of which is supplied by track transformer 10' at the right of said drawing, said circuit including the track relay 10 at the left of said drawing. Because of the presence of the train 128 the track circuit of block B has been short circuited, thereby cutting off the current from track relay 10 and allowing armature 16 to fall away and open the circuit of high-potential transformer 14 of block A, thereby causing a cessation of the supply of energy to the wayside circuit comprising the elements 27 and 28 of that block. A following train will be prevented from traveling far in block A, for the reason that the main element 27 of the wayside circuit which extends out of block A into the succeeding block will be deprived of its energy and would fail to impress a current flow in the receiving circuit of that train. This condition will allow the main relay of the train following to open by gravity and thereby open the circuits of the solenoids 99 and 100, permitting the valves controlled by said solenoids to open and apply the brakes and blow the whistle 115, which will not only bring the train to a stop, but will also give an audible warning to the engine man of the obstruction in the block B ahead.

In view of the possibility of the whistle 115 not sounding through the failure of the air or for some other cause, there is provided a visual signal in the form of a red light 129 (see Figs. 4, 5, and 6) which is located in a circuit comprising the line 101 leading from positive bus-bar 68, movable contact 103 of the main relay, and back contact 132, on metallic frame 133, binding terminal 134 connected therewith, on line 135, and on connected line 136 leading to said lamp. The return side of said circuit is completed by short line 137 connected to line 127 which leads to the negative bus-bar 69, whereby, by opening of the main relay current will be caused to flow through the circuit of the red lamp 129 and by the illumination thereof afford an additional visual danger signal. Assuming that the train is running under conditions of safety with the parts in the condition shown in Fig. 4, with the train pipe and signal valves closed and the green lamp burning, and is occupying the block B of the track; and further assuming that another train is occupying block C as indicated at 138 in Fig. 5, then said train in block C will short circuit the track circuit of said block and deënergize track relay 10 of block C controlling the generator of block B, thereby opening the circuit of the high-potential transformer 14 and cutting off the supply of energy to the wayside circuit conductor 27 and 28 in block B. The absence of current in the wayside circuit will cause the impressed current in the receiving circuit to cease, and a consequent deënergization of the main relay which will open by gravity and break the circuits of the solenoids 99 and 100, permitting the valve in the train pipe to open and apply the brakes, and the whistle valve to open and sound the whistle, at the same time opening the green lamp circuit and closing the circuit of the red lamp, thereby indicating to the engine man a condition of danger and notifying him of the presence of a train or other obstruction in the block ahead.

Should the engine man desire to release the brakes of his train and proceed slowly forward under check until the end of the block is reached, he may do so by depressing the release key 139 (Fig. 6 wherein 130 indicates the train in block B) which will close the circuit across the terminals of the lines 127 and 140, said line 127 leading to the negative bus-bar 69 and the circuit being completed on line 101 from the positive bus-bar, the rear contact 132, the frame 133, the binding post 134, the line 135 to line 141, to one terminal of the winding of the relay 142, and from the other terminal of said winding on line 143 to line 140 back to said release key 139, thus causing a flow of current from the battery 70 through the relay 142, energizing said relay and actuating its armature 144 to press the movable contact 145 against the contact 146. This effects the closing of the local circuit through the relay 142 comprising the short line 147 from said contact 146, the connected line 127, negative bus-bar 69, through the battery, then over positive bus-bar and line 101 leading therefrom, movable contact 103 of the main relay, rear contact 132, metal frame 133, and lines 135 and 141, to one terminal of the winding of said relay, and from the other terminal of said winding on line 143 to movable contact 145. It will thus be seen that the momentary closing of the release key (which is self-restoring) will establish a local circuit through the relay 142 and maintain said relay closed notwithstanding the circuit of the release key may be immediately opened by releasing said key. The movement of the armature 144 of the relay 142 not only closes its local circuit just described, but also actuates the movable contact 148 and carries it into engagement with the contact 149, thereby closing a circuit at said contacts, comprising the line 150 leading to the positive bus-bar, then to the storage battery and back to the negative bus-bar and over the lines 110 and 109 to one terminal of the winding of the solenoid 99 and from the other terminal of said winding on line 106 to line 151 and to the other movable contact 148, thus causing a flow of current through solenoid 99 and energizing said coil to lift its core and close valve 112 of the train pipe 114, thereby releasing the brakes and enabling the engine man to proceed under control, as shown in Fig. 6. But the whistle 115 will continue to blow and the red light will still glow as a constant warning of danger.

When the engine man has taken his train to the limit of the block B by releasing the brakes and under control with the conditions indicating danger as just described and illustrated in Fig. 6, he brings his train to a stop at the entrance of the next block and there remains until the apparatus in the cab indicates a condition of safety. This indication will not be given until the train ahead has passed over block C through block D, and into block E, when the track relay 10 for block D will again be energized, thereby closing the high-potential generator circuit for block C restoring energy to the wayside circuit member 27 of said block and enabling the train lying in block B at the entrance to block C to pick up energy from the wayside circuit conductor 27 of block C. After the main relay has been closed by current from the counterpoise of block B which became energized when the train left block C, thereby holding closed said main relay, through the operation of the thermo-electric relay, and causing a consequent energizing of the solenoids 99 and 100 to close the train valve and whistle valve respectively; the cutting out of current from the red lamp, and a return flow of current through the circuit of the green lamp. The closing of the main relay 57 will also break the local circuit of the relay 142 and open the circuits at the contacts 145 and 146, and 148 and 149 respectively. This restoration of the apparatus in the engine cab by the closing of the main relay through the operation of the thermo-electric relay in the receiving circuit will indicate a condition of safety under which the engine man may proceed. As was stated, the relay 142 was energized by a current which passed from the positive bus-bar 68 over the wire 101 to the movable contact 103, frame 133, binding post 134, wire 135 to the relay, and from the relay over the wire 143, contacts 145 and 146, wires 147 and 127 to the negative bus-bar 69. When the main relay 57 is energized, the movable contact will be disengaged from the contact 132 carried by the frame 133, and this local circuit to the relay 142 will be opened, resulting in a separation of the contacts 145 and 146, and of the contacts 148 and 149.

Referring again to the arrangement shown with respect to the insulated blocks or sections of the track, and the location of the main wayside circuit conductor and the counterpoise with respect thereto, it is again pointed out that the main wayside circuit wire 27 of one block extends beyond the point of insulation of the track rails into the next block, and that the counterpoise 28 extends from the terminal of the main wayside circuit to a point in transverse alinement with the track insulation. This arrangement is made to provide for proper operative conditions, the purpose of which, in connection with the running of trains, may be described as follows: A train passing along the east bound track and stopping in block D will short circuit the track circuit for said block, and cut off the current supply from the main wayside circuit and the counterpoise in block C. Under these conditions, a train following will have a clear indication until it reaches the entrance to block C. When that point is reached, however, because of the absence of the wayside current in the radiating circuit of block C, the receiving circuit on the locomotive will receive no current and the main relay will open by gravity, thereby causing an application of the brakes, the sounding of the whistle, and the illumination of the red light as before described, indicating to the engine man a condition of danger and bringing his train to a stop.

Should the engine man desire, he may release his brakes by an operation of the releasing key, and proceed with his train under control, to the entrance of block D, where he should lie with his train until he gets a clear indication to proceed. When lying at the entrance of block D, the harp 63 of the pick-up branch of the receiving circuit will extend over the counterpoise of block C, in which position the engine man will receive an intermittent indication of safety when the train that was in block D shall have passed into block E. The reason said indication will be intermittent is owing to the fact, that, while counterpoise 28 of block C will be energized, the main wayside circuit 27 of block D, which extends into block C will be without current because of the presence of the train in block E. The current passing through the thermo-electric relay from the pick-up branch of the receiving circuit will actuate it to close the local circuit of the main relay and energize said relay to attract its armature and break the pick-up branch of the receiving circuit, but said main relay will not remain energized because the main wayside circuit for block D is without current, permitting the armature of said relay to drop back and again close the pick-up branch of the receiving circuit, when the main relay will again become momentarily energized and the pick-up branch of the receiving circuit will be again broken, thus causing a vibration of the armature of the main relay and an intermittent opening and closing of the circuits controlling the signal and train stopping devices; therefore, the engine man will be obliged to hold his train at the entrance of block D, until the train ahead has given to block D a clearing indication by passing from block E. The passing of the train from block E will restore the track circuit in said block, and reënergize the track relay 10 shown at the right of Fig. 2, thereby closing the generating circuit for block D, and supplying a high-frequency, high-potential current to the wayside circuit 27 and 28 of said block. The return of current to the wayside circuit of block D will be manifest to the engine man, whose train is lying at the entrance of said block by a continued energization of the main relay and the consequent closing of the train line and whistle valves, as well as by the extinction of the red light and the illumination of the green light.

The performance of the functions just described indicates a condition of safety, under which the train held at the entrance of block D may proceed under usual running conditions with the assurance that the train in front is at least two full blocks ahead. By extending the harps of the receiving circuit and the pick-up branch thereof in opposite directions as shown, provision is made for rendering them operative whether the train be running forward or backward.

It will now be understood that the generation of a high-frequency, high-potential energy for the wayside circuit is controlled by a track circuit in such a manner as to afford a continuous supply of energy to the wayside circuit under conditions of safety, and to cause a suspension of said energy in said circuit under conditions of danger within or in respect to the zone guarded or controlled by said apparatus.

It is believed that one portion of the fixed conductor parallel with the track together with the harp of the receiving circuit on the vehicle constitute the metallic elements of a condenser, and that another portion of said fixed conductor together with the track rail form the metallic elements of a second condenser, the intervening air in the case of both condensers serving as a dielectric. With these elements so acting a circuit is formed through a part of the fixed conductor to the receiving circuit on the vehicle, thence through the responder to the ground, and back to the other part of the fixed conductor by way of the ground and the track rail. This accounts for the strong current through the responder and for other effects observed in practising this invention.

Having thus fully set forth my invention, what I claim as new and desire to secure by Letters Patent is:—

1. In train control apparatus, a track, a vehicle on said track, a source of alternating electro-motive force, a wire near the ground extending from one side of said source parallel with the track, a wire near the ground extending parallel to the track connected to the other side of said source, a conductor carried by said vehicle comprising two branches, one near to each of said wires, an instrument in said conductor responsive to current flow therein, and a connection between said conductor and the ground.

2. In train control apparatus, a track, a source of high potential oscillating current, a fixed conductor connected therewith and extending parallel to the track, and means for completing a closed oscillating circuit from said conductor back to said source, said means including a conductor carried by a vehicle, said conductor traveling adjacent to but separated from the fixed conductor and including a suitable translating device.

3. In train control apparatus, a track, a source of high potential oscillating current, a fixed conductor connected therewith and extending parallel to the track, and a grounded conductor on a vehicle having an element adjacent to but separated from the fixed conductor, for completing a closed oscillating circuit from said fixed conductor back to its source, said conductor on the vehicle including a suitable translating device.

4. In train control apparatus, a track, a source of high potential oscillating current, a fixed conductor connected therewith and extending along the track, a conductor on a vehicle having an element adjacent to but separated from the fixed conductor, means to ground the conductor on the vehicle and a translating device in said vehicle carried conductor depending for its action entirely upon current flowing in the train carried conductor.

5. In a railway system of train control, a track, a wayside circuit disposed in parallelism with the track comprising two limbs out of alinement with each other, a circuit for generating a high-frequency high-potential current, a variable inductance included in said generating circuit, the limbs of the wayside circuit being independently and adjustably connected to said inductance, a vehicle adapted to move along the track, a receiving circuit on said vehicle having a portion disposed adjacent one limb of said wayside circuit, a second receiving circuit on said vehicle having a portion adapted to become disposed adjacent the other limb of the wayside circuit, and an instrument in and common to both circuits on the vehicle adapted to be actuated by the flow of current through either of said circuits.

6. A train control apparatus comprising a track, a wayside circuit disposed in parallelism with the track and comprising a main limb, and a counterpoise out of alinement with the main limb, a circuit for generating high-frequency high-potential current for said wayside circuit, a vehicle adapted to move along the track, a receiving circuit on said vehicle having a branch with a portion disposed adjacent the main limb of said radiating circuit, a second branch of the receiving circuit on said vehicle having a portion disposed adjacent the counterpoise of said wayside circuit, and signal controlling instrumentalities actuable by a flow of current in either of the branches of the receiving circuit on the vehicle.

7. In train control apparatus, a track, a source of high-potential oscillating current, a wayside conductor connected therewith and extending parallel to the track, a conductor carried on a vehicle, including a translating device and having a portion spaced from the wayside conductor such a distance that sufficient electro-static action takes place between said wayside conductor and said portion to establish in the vehicle-carried conductor a current sufficient to sensibly affect the translating device.

8. In train control apparatus, a track, a vehicle on said track, a source of alternating electro-motive force including a tuning device, a wayside circuit near the ground comprising one limb extending from one point on said tuning device parallel with the track and a second limb out of alinement with the first, also parallel to the track and connected to another point on the tuning device, a receiving conductor carried by said vehicle and comprising two branches, one near each of the limbs of the wayside circuit, a translating device connected to said conductor, and a second conductor on the vehicle including a tuning device for grounding the translating device.

9. In train control apparatus, a track, a wayside circuit parallel with the track, means for supplying current to the wayside circuit, a vehicle movable along the track, a receiving circuit on said vehicle, a terminal element for said receiving circuit comprising a plurality of parallel strands connected thereto, said terminal element being disposed to receive current from the wayside circuit, and an instrument in the receiving circuit mechanically actuatable by the flow of current therein.

10. In a train control apparatus, a track, a wayside circuit parallel with the track having portions disposed out of alinement with each other, means for supplying a high-potential high-frequency current to the wayside circuit, a vehicle movable along the track, a receiving circuit on the vehicle comprising two branches, one branch of said receiving circuit having a capacity affording element disposed adjacent a portion of the wayside circuit, the other branch of the receiving circuit having a capacity affording element disposed adjacent another portion of the wayside circuit, and an instrument in and common to both branches of the receiving circuit mechanically actuatable by the flow of current in either branch.

11. In a railway block system of train control, insulated track sections dividing the track into blocks, a wayside circuit for each block having two limbs disposed out of alinement, one limb terminating at the point of insulation between said block and an adjacent block and the other limb extending beyond the point of insulation between said block and the other adjacent block, means in each block for supplying current to the limbs of the wayside circuit, a vehicle on the track, a receiving circuit on said vehicle having a branch disposed to receive current from one limb of the wayside circuit, and a branch disposed to receive current from the other limb of the wayside circuit, and instrumentalities actuatable by the flow of current in the branches of the receiving circuit.

12. In a railway block system of train control, insulated track sections dividing the track into blocks, a wayside circuit for each block comprising a main limb and a pick-up limb, the pick-up limb of the wayside circuit of said block terminating at the point of insulation at one end of the block, the main limb of the wayside circuit extending beyond the point of insulation at the other end of the block, and means for supplying current to the limbs of the wayside circuit of each block.

13. In a railway block system of train control, insulated track sections dividing the track into blocks, a wayside circuit for each block having two limbs, one limb of said circuit terminating at the point of insulation at one end of the block and the other limb extending beyond the point of insulation at the other end of the block into the succeeding block and both of said limbs being located in parallelism with the track, means for supplying current to the limbs of the wayside circuit for each block, a vehicle on said track, a receiving circuit on said vehicle, said receiving circuit having a line provided with a portion disposed to receive current from one limb of the wayside circuit and having a line with a portion disposed to receive current from the other limb of the wayside circuit, and a translating device on said vehicle, in the receiving circuit.

14. In train control apparatus, a source of high potential oscillating current, a condenser, said condenser including as elements a fixed conductor parallel to the track and connected to said source, and a grounded conductor carried by a vehicle and traveling adjacent to but separated from said fixed conductor, and a suitable translating device connected with said train carried conductor.

In testimony whereof, I sign this specification in the presence of two witnesses.

THOMAS E. CLARK.

Witnesses:-
H. R. MILLER,
J. OTTO BAENZIGER.